United States Patent [19]
Bates

[11] Patent Number: 5,314,765
[45] Date of Patent: May 24, 1994

[54] PROTECTIVE LITHIUM ION CONDUCTING CERAMIC COATING FOR LITHIUM METAL ANODES AND ASSOCIATE METHOD

[75] Inventor: John B. Bates, Oak Ridge, Tenn.

[73] Assignee: Martin Marietta Energy Systems, Inc., Oak Ridge, Tenn.

[21] Appl. No.: 137,285

[22] Filed: Oct. 14, 1993

[51] Int. Cl.$^5$ .................................... H01M 10/40
[52] U.S. Cl. ................................ 429/194; 429/218; 429/48; 29/623.5
[58] Field of Search ............... 429/218, 194, 48, 197; 29/623.5

[56] References Cited

U.S. PATENT DOCUMENTS

| | | | |
|---|---|---|---|
| 3,208,882 | 9/1965 | Markowitz | 429/13 |
| 3,528,856 | 9/1970 | Ovshinsky | 429/27 |
| 3,615,835 | 10/1971 | Ovshinsky | 429/196 X |
| 4,516,317 | 5/1985 | Bailey | 29/623.5 |
| 4,608,753 | 9/1986 | Fleischer | 429/48 X |
| 4,888,258 | 12/1989 | Desjardius et al. | 429/194 |
| 4,997,730 | 3/1991 | Morigaki et al. | 429/48 |

OTHER PUBLICATIONS

D. S. Rajoria and J. P. deNeufville, "Improved Coatings for Lithium Anodes", pp. 488-497 in Proc. Int. Power Sources Symp. 1986.
*Chemical Abstracts*, vol. 102, 1985, p. 160 reference to U.S. pat appln 507,752, Jun. 27, 1983 by applicants Deneufville et al.
*Energy Technology*, vol. 108, 1988, p. 153 reference to pat appln 86/170,177 Jul. 19, 1986 by applicants Nagai et al.
*Chemical Abstracts*, vol. 105, 1986, p. 190 reference to pat appln 84/203,569, Sep. 28, 1984 by applicant Osaki.
*Energy Technology*, vol. 115, 1991, p. 255 reference to pat appln 89/308,861, Nov. 30, 1989 by applicants Yoneyama et al.

*Primary Examiner*—Anthony Skapars
*Attorney, Agent, or Firm*—Michael E. McKee; J. Donald Griffin; Harold W. Adams

[57] ABSTRACT

A battery structure including a cathode, a lithium metal anode and an electrolyte disposed between the lithium anode and the cathode utilizes a thin-film layer of lithium phosphorus oxynitride overlying so as to coat the lithium anode and thereby separate the lithium anode from the electrolyte. If desired, a preliminary layer of lithium nitride may be coated upon the lithium anode before the lithium phosphorous oxynitride is, in turn, coated upon the lithium anode so that the separation of the anode and the electrolyte is further enhanced. By coating the lithium anode with this material lay-up, the life of the battery is lengthened and the performance of the battery is enhanced.

15 Claims, 1 Drawing Sheet

PROTECTIVE LITHIUM ION CONDUCTING CERAMIC COATING FOR LITHIUM METAL ANODES AND ASSOCIATE METHOD

BACKGROUND OF THE INVENTION

This invention relates generally to batteries, and relates more particularly, to the structure and methods of construction of rechargeable lithium batteries.

Heretofore, the life and performance of lithium batteries have been limited by two major factors. The first of such factors relates to the occurrence of a chemical reaction between the liquid organic or polymer electrolyte and the lithium anode so that a resistive film barrier forms upon the anode. This film barrier increases the internal resistance of the battery and lowers the amount of current capable of being supplied by the battery at the rated voltage.

The second of such factors relates to the undesirable consequences which can result from repeated cycling of the battery. More specifically, battery cycling is at least partly responsible for the dendritic growth of Li on the anode and the formation of a passivating powder-like substance commonly referred to as "dead" lithium at the surface of the lithium anode, either of which can adversely affect the efficiency of the battery. In addition to reducing efficiency, the Li dendrites may grow large enough to touch the cathode through the electrolyte and thereby short the battery.

It is an object of the present invention to provide a new and improved lithium battery structure which circumvents the aforedescribed limitations and an associated method of making the battery.

Another object of the present invention is to provide such a battery having a structure which reduces the likelihood of the occurrence of an undesirable chemical reaction between the electrolyte and the lithium anode of the battery.

Still another object of the present invention is to provide such a battery having a structure which prevents the formation of Li dendrites or passivating "dead" lithium at the anode surface.

SUMMARY OF THE INVENTION

This invention resides in a battery having a cathode, a lithium anode, and an electrolyte disposed between the cathode and anode, and a method of making the battery.

The battery of the invention includes a layer of lithium phosphorus oxynitride overlying so as to coat the lithium anode so that the lithium anode is separated from the electrolyte by the lithium phosphorus oxynitride layer. The method of the invention includes, during a battery-making process, a step of depositing a film of lithium phosphorus oxynitride over the lithium anode prior to the positioning of the electrolyte material adjacent the anode so that in the resultant battery, the lithium phosphorous oxynitride is interposed between the lithium anode and the electrolyte.

DETAILED DESCRIPTION OF AN ILLUSTRATIVE EMBODIMENT

Figure 1:
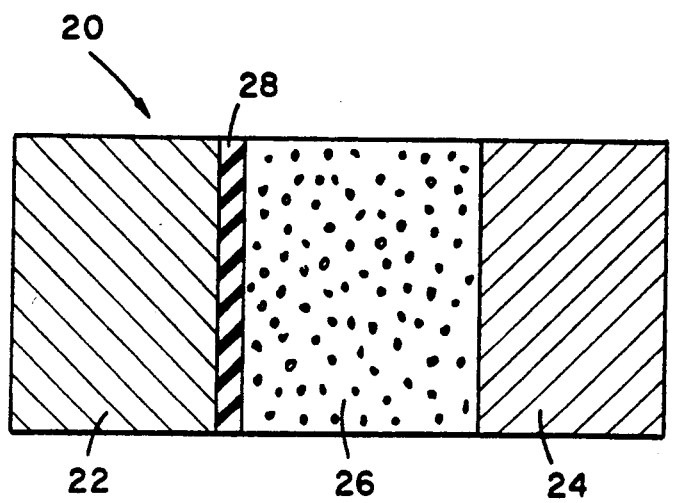
FIG. 1 is a schematic cross-sectional view of one embodiment of a battery within which features of the present invention are incorporated.

Turning now to the drawings in greater detail, there is shown in FIG. 1 a schematic representation of a rechargeable lithium battery, generally indicated 20, within which features of the present invention are employed. The battery 20 includes a lithium anode 22, a cathode 24 and an electrolyte 26 disposed between the anode 22 and cathode 24. As will be described herein, the anode 22 is prevented from directly contacting the electrolyte 26 by means of a protective film 28 overlying so as to coat the anode 22.

The present invention is envisioned as being well-suited to rechargeable lithium batteries in which dendrite formation and/or reaction of the electrolyte with the lithium anode can degrade the battery performance. However, the principles of the present invention can be variously applied.

The components of the battery 20 may each be fabricated and/or assembled by any of a number of construction techniques. In the interests of the present invention, the lithium anode 22 may take the form of a relatively thick foil or sheet of lithium metal. The cathode 24 can be comprised of $V_2O_5$, $V_3O_8$, $V_6O_{13}$, $LiCoO_2$, $LiMn_2O_4$, $TiS_2$ or any of a number of other lithium intercalation compounds either as a single phase or mixed with a polymer electrolyte and/or graphite or other electronic conductor. The electrolyte layer 26, on the other hand, can be comprised of a solid organic polymer containing an inorganic lithium salt or an organic liquid containing a dissolved lithium salt.

In the depicted FIG. 1 embodiment 20, the protective film 28 is comprised entirely of a layer of lithium phosphorus oxynitride, a material developed by the assignee of the present invention. This material is a solid ceramic material capable of conducting lithium ions therethrough. During the formation of the battery 20, the protective thin film 28 can be deposited upon the anode 22 by either rf magnetron sputtering of $Li_3PO_4$ in the presence of pure nitrogen ($N_2$) or by rapid electron beam evaporation of $Li_3PO_4$ in the presence of pure $N_2$. Each of these types of deposition processes, i.e. magnetron sputtering and the electron beam evaporation, are well known so that a more detailed description is not believed to be necessary. A film 28 having a thickness of between 0.1 and 0.5 $\mu$m provides satisfactory protection of the lithium anode.

Figure 2:
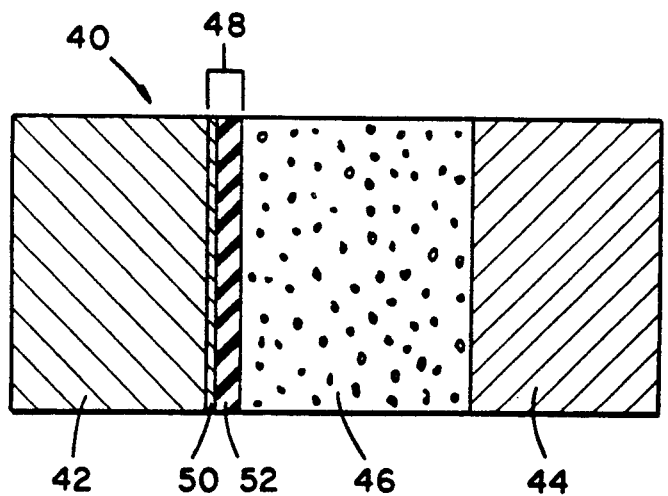
FIG. 2 is a view similar to that of FIG. 1 of another embodiment of a battery.

With reference to FIG. 2, there is schematically illustrated another battery embodiment, generally indicated 40, within which features of the present invention are embodied. The battery 40 includes a lithium anode 42, a cathode 44 and an electrolyte 46 disposed between the anode 42 and cathode 44. As is the case with the battery 20 of FIG. 1, the anode 22 is prevented from directly contacting the electrolyte 46 by means of a protective film 48 overlying so as to coat the anode 42.

The protective film 48 of the FIG. 2 battery 40 includes two layers 50, 52 superposed upon the lithium anode 42. The first layer 50 of these layers, i.e. the layer which directly contacts the anode surface, is comprised of a solid film of lithium nitride ($Li_3N$), while the second layer 52 of these layers is comprised of a solid film of the aforementioned lithium phosphorus oxynitride. During a battery-making operation, the first layer 50 of $Li_3N$ is formed over the lithium metal anode by either controlled exposure of the anode to $N_2$ at temperatures from about 30° to 100° C., electron beam evaporation of Li$_3$N, or by magnetron sputtering of Li$_3$N in N$_2$.

A purpose served by the formation of the Li$_3$N layer 50 is that the layer 50 coats the surface of the lithium anode 42 in a manner which reduces the likelihood of (undesirable) oxidation of the lithium metal of the anode 42 during fabrication of the battery 40. Thus, it may be desired to include the Li$_3$N layer 50 as a protective measure during the battery fabrication process, rather than a means to enhance battery performance. A film thickness of the layer 50 of between about 0.05 and 0.1 μm is satisfactory for the purpose served by the layer 50.

During the formation of the battery 20, the second layer 52 of the protective thin film 48 can be deposited upon the first layer 50 by either rf magnetron sputtering of Li$_3$PO$_4$ in the presence of pure nitrogen (N$_2$) or by rapid electron beam evaporation of Li$_3$PO$_4$ in the presence of pure N$_2$. By way of example, the layer 52 may possess a film thickness of between about 0.1 and 0.5 μm.

The aforedescribed protective films 28 (FIG. 1) and 48 (FIG. 2) are advantageous in that each film protects the corresponding anode 22 or 42 from direct contact with the electrolyte 26 or 46. By preventing such direct contact, the likelihood of a film barrier-forming chemical reaction is significantly reduced, and the formation of dendritic growth of Li or the passivating "dead" Li upon the anode due to the cycling of the battery is significantly reduced. Moreover, by reducing the likelihood of the formation of a reaction-spawned film barrier (which is resistive in nature), the longer the battery will be capable of supplying the desired current at the rated voltage. Still further, by preventing the dendritic growth of Li on the anode and preventing the formation of "dead" lithium upon the anode surface, the efficiency of the battery will not be adversely affected by these factors.

Yet still further, the aforedescribed films 28 and 48 do not appreciably effect the performance of the batteries in an adverse manner. This fact has been supported by tests involving a 0.25 μm thick coating of lithium phosphorus oxynitride over the lithium anode in a lithium cell of 2.5 V. During such tests, this test battery sustained a current density of 10 mA/cm$^2$ with only a 5% drop in voltage at a temperature of 25° C. due to the protective coating. These test results were based upon a measured electrolyte resistivity at 25° C. of $5 \times 10^5$ ohm-cm.

It will be understood that numerous modifications and substitutions can be had to the aforedescribed embodiments without departing from the spirit of the invention. Accordingly, the aforedescribed embodiment is intended for the purpose of illustration and not as limitation.

I claim:

1. In a battery including a cathode, a lithium anode, and an electrolyte interposed between the cathode and anode, the improvement comprising:
   a protective film including a layer of lithium phosphorus oxynitride overlying and coating the lithium anode so that the lithium anode is separated from the electrolyte by the lithium phosphorus oxynitride layer.

2. The improvement as defined in claim 1 wherein the thickness of the layer of lithium phosphorus oxynitride of the protective film is between about 0.1 and 0.5 μm.

3. The improvement as defined in claim 1 wherein the protective film further includes a layer of lithium nitride (Li$_3$N) disposed between the surface of the lithium anode and the layer of lithium phosphorus oxynitride.

4. The improvement as defined in claim 3 wherein the thickness of the layer of lithium nitride of the protective film is between about 0.05 and 0.1 μm.

5. The improvement as defined in claim 4 wherein the thickness of the layer of lithium phosphorus oxynitride of the protective film is between about 0.1 and 0.5 μm.

6. A battery structure comprising:
   a cathode;
   a lithium anode;
   an electrolyte disposed between the cathode and the lithium anode; and
   a layer of lithium phosphorus oxynitride overlying and coating the lithium anode so that the lithium anode is prevented from contacting the electrolyte by the lithium phosphorus oxynitride layer.

7. The structure as defined in claim 6 wherein the thickness of the layer of lithium phosphorus oxynitride of the protective film is between about 0.1 and 0.5 μm.

8. The improvement as defined in claim 6 wherein the protective film further includes a layer of lithium nitride (Li$_3$N) disposed between the surface of the lithium anode and the layer of lithium phosphorus oxynitride.

9. The improvement as defined in claim 6 wherein the thickness of the layer of lithium nitride of the protective film is between about 0.05 and 0.1 μm.

10. The structure as defined in claim 9 wherein the thickness of the layer of lithium phosphorus oxynitride of the protective film is between about 0.1 and 0.5 μm.

11. In a battery-forming operation involving the positioning of a lithium anode and an electrolyte material adjacent to one another, the improvement comprising:
   coating the lithium anode by depositing a film of lithium phosphorus oxynitride over and coating the lithium anode prior to the positioning of the lithium anode and electrolyte material adjacent one another so that when the lithium anode and electrolyte material are positioned adjacent one another in the resultant battery, the lithium phosphorous oxynitride is interposed between the lithium anode and the electrolyte.

12. The improvement as defined in claim 11 wherein the depositing step effects the formation of a lithium phosphorus oxynitride film having a thickness of between about 0.1 and 0.5 μm.

13. The improvement as defined in claim 11 wherein the step of depositing a film of lithium phosphorus oxynitride is preceded by a step of depositing a film of lithium nitride (Li$_3$N) over so as to coat the lithium anode so that the subsequent step of depositing the film of lithium phosphorus oxynitride coats the Li$_3$N with the lithium phosphorus oxynitride film.

14. The improvement as defined in claim 13 wherein the step of depositing the film of Li$_3$N effects the formation of the Li$_3$N film having a thickness of between about 0.05 and 0.1 μm.

15. The improvement as defined in claim 14 wherein the step of depositing a film of lithium phosphorus oxynitride effects the formation of the lithium phosphorus film of between about 0.1 and 0.5 μm.

* * * * *